United States Patent

[11] 3,611,420

[72] Inventor Luc P. Benoit
Los Angeles, Calif.

[21] Appl. No. 821,232
[22] Filed May 2, 1969
[45] Patented Oct. 5, 1971
[73] Assignee Bell & Howell Company
Chicago, Ill.

[54] CURIE POINT RECORDING BY UTILIZATION OF SELECTIVE COOLING
26 Claims, 17 Drawing Figs.

[52] U.S. Cl. .......... 346/74 MT, 179/100.2 CR, 250/65 T
[51] Int. Cl. .......... G01d 15/12
[50] Field of Search .......... 346/74 MT; 179/100.2 CR, 100.2 CF; 250/65 T; 340/174; 161/410, 412; 117/37 R, 235, 17.5

[56] References Cited

UNITED STATES PATENTS

| | | | |
|---|---|---|---|
| 2,793,135 | 5/1957 | Sims et al. | 346/74 |
| 3,176,278 | 3/1965 | Mayer | 346/74 X |
| 3,250,636 | 5/1966 | Wilferth | 117/37.5 X |
| 3,512,170 | 5/1970 | Nelson | 346/74 |

*Primary Examiner*—Bernard Konick
*Assistant Examiner*—Gary M. Hoffman
*Attorney*—Raymond A. Andrew

ABSTRACT: In information-recording methods and apparatus a magnetic recording medium is selectively subjected to a cooling cycle in the presence of a magnetic field to provide a magnetic record of the information. The cooling cycle is only carried out in portions of the magnetic recording medium which have been selected in response to the input information. This may be implemented by applying cooling media only to the selected portions, or by preventing complementary portions from going through the cooling cycle simultaneously with the selected portions.

INVENTOR.

INVENTOR.
[signature]

INVENTOR.

Jean P. Benoit

INVENTOR.

Luc P. Benoit

PATENTED OCT 5 1971 3,611,420

INVENTOR.

CURIE POINT RECORDING BY UTILIZATION OF SELECTIVE COOLING

RELATED APPLICATIONS

Subject matter of the present disclosure is related to subject matter disclosed in the following patent applications, the contents of which are herewith incorporated herein by reference:

Ser. No. 821,394, Magnetic Information Recording, filed of even date herewith, by the present inventor, and assigned to the present assignee;

Ser. No. 821,321, Magnetic Information Recording, filed of even date herewith, by the present inventor, and assigned to the present assignee.

BACKGROUND OF THE INVENTION

1. Field of the Invention

The subject invention relates to magnetic information recording and, more specifically, to thermomagnetic information-recording methods and apparatus.

2. Prior Art

Thermomagnetic recording methods have received intensified interest in recent years since they point to information-recording techniques that are superior to those attainable with magnetic recording head structures and that permit advanced processes such as imaging and document copying.

A class of thermomagnetic recording methods known under the designation "thermoremanent magnetization" points to techniques which are potentially capable of providing magnetic records that are superior in intensity and resolution to records produced by an information-controlled selective demagnetization of a premagnetized medium.

Briefly, if a magnetic recording medium is heated to temperatures above its Curie point, the ferromagnetic property of the recording medium gives way to paramagnetism. If the medium is cooled in the absence of a magnetic field, it acquires a highly random magnetization state. By contrast, if the medium is cooled in the presence of a magnetic field, it acquires a strong remanent magnetization the intensity of which is superior to that obtained by isothermal remanent magnetization or even by anhysteretic remanent magnetization (see C.D. Mee, THE PHYSICS OF MAGNETIC RECORDING, (Nothe-Holland Publishing Co., 1964), pp. 80 to 84 and particularly FIG. 3.19).

This thermoremanent magnetization phenomenon can be exploited in at least three basic ways:

First, it is possible to record an information signal on an advancing magnetic recording medium by using a magnetic recording head and by cooling the previously heated medium through its Curie point region as it passes the recording head;

Secondly, it is possible to copy a magnetic record which is present on a master magnetic recording medium. To this end, a copy magnetic recording medium is brought into contact with the master medium. The copy medium has a lower Curie point than the master medium and is heated to a temperature which is higher than its Curie point, but lower than the Curie point of the master medium. The copy medium is thereupon caused to cool in the presence of the magnetic record on the master medium, whereby a strong copy of such record is produced on the copy medium.

The first and second methods just described are functionally related in that the information to be recorded or copied is in both cases contained in the magnetic field rather than in the applied thermal energy.

In a third thermoremanent magnetization method, the information to be recorded is contained in the applied thermal energy. To this end a thermal gradient pattern containing the information to be recorded (such as an image or the contents of a document) is produced and is applied to a magnetic recording medium to heat selected areas thereof to temperatures above its Curie point. The medium is thereupon cooled in the presence of a magnetic field whereby a strong magnetic information record is obtained.

If desired, one could within the purview of the third method use a heated stylus which is moved relative to he recording medium in contact therewith to produce a heated trace representing the information. This "oscillograph trace" could thereupon be converted into a magnetic trace by a cooling thereof in the presence of a magnetic field. In either case the resulting information record of magnetic trace may be printed out by means of a magnetic toner, composed of magnetic particles which are encapsulated in fusible shells.

Thermoremanent magnetization methods are superior in terms of resolution and intensity of the resulting record to selective demagnetization techniques in which a premagnetized medium is selectively demagnetized in response to the information to be recorded or copied. However, thermoremanent magnetization techniques still have several drawbacks which impede their acceptance, particularly in the imaging and document-copying field.

For instance, it is still difficult to provide thermoremanent-magnetization document-copying equipment that produces a positive copy of an original. Also, the spreading in the recording medium of the thermally applied information prior to and during the cooling cycle has deleterious effects on the attainable resolution.

SUMMARY OF THE INVENTION

Upon careful analysis I have found that the latter problems have their origin in the fact that the above-mentioned third thermoremanent magnetization method has consistently been approached by the prior art in terms of an information-controlled application of heat to the recording medium prior to the cooling cycle.

In contrast thereto, my invention resides in the concept of controlling in response to the information to be recorded, and in the course of the cooling cycle, the flow of heat relative to the recording medium. Broadly stated, my invention controls the cooling cycle, rather than the heating step, in response to the information to be recorded.

As the description proceeds it will be noted that the subject invention provides a series of information-recording methods and apparatus that have highly advantageous features over the prior art.

From one aspect thereof, the subject invention relates to methods of recording information in a magnetic recording medium magnetizable by subjection to a cooling cycle through a temperature range in the presence of a magnetic field.

More specifically, the currently discussed aspect of the invention resides in the improvement comprising the steps of providing the magnetic recording medium with a temperature above the mentioned range, providing cooling means, selecting portions of the recording medium in response to the information, applying the mentioned magnetic field to the recording medium, applying the cooling means only to the mentioned selected portions of the recording medium so as to subject only these selected portions to the mentioned cooling cycle in the presence of the magnetic field whereby to provide a magnetic record of the information.

In a preferred embodiment of the invention, the application of the cooling means to the recording medium is varied in response to the information.

From a further aspect thereof, the subject invention is also concerned with methods of recording information in a magnetic recording medium magnetizable as mentioned above. This aspect of the invention resides in the improvement comprising the steps of applying heat to the recording medium along a track, altering the course of that track in response to the information, and cooling the recording medium along that track and applying a magnetic field to the recording medium along that track to provide a magnetic record of the information.

From yet another aspect thereof, the subject invention is also concerned with methods of recording information in a magnetic recording medium magnetizable as mentioned above. The latter aspect of the invention resides in the improvement comprising the steps of applying heat energy to the recording medium to prepare the recording medium for the mentioned cooling cycle, providing a thermal pattern corresponding to the information, providing an external magnetic field, applying the external magnetic field to the recording medium, applying the mentioned thermal pattern to the recording medium and reducing the mentioned heat energy to initiate a cooling cycle of information-representative portions of the recording medium, and continuing the application of the mentioned thermal pattern and of the external magnetic field to the recording medium after the initiation of the cooling cycle whereby to provide a magnetic record of the information.

The invention resides also in information-recording apparatus, as will become apparent in the course of this disclosure.

BRIEF DESCRIPTION OF THE DRAWINGS

The invention will be more readily apparent from the following detailed description of preferred embodiments thereof, illustrated by way of example in the accompanying drawings, in which.

DESCRIPTION OF PREFERRED EMBODIMENTS

Figure 1:
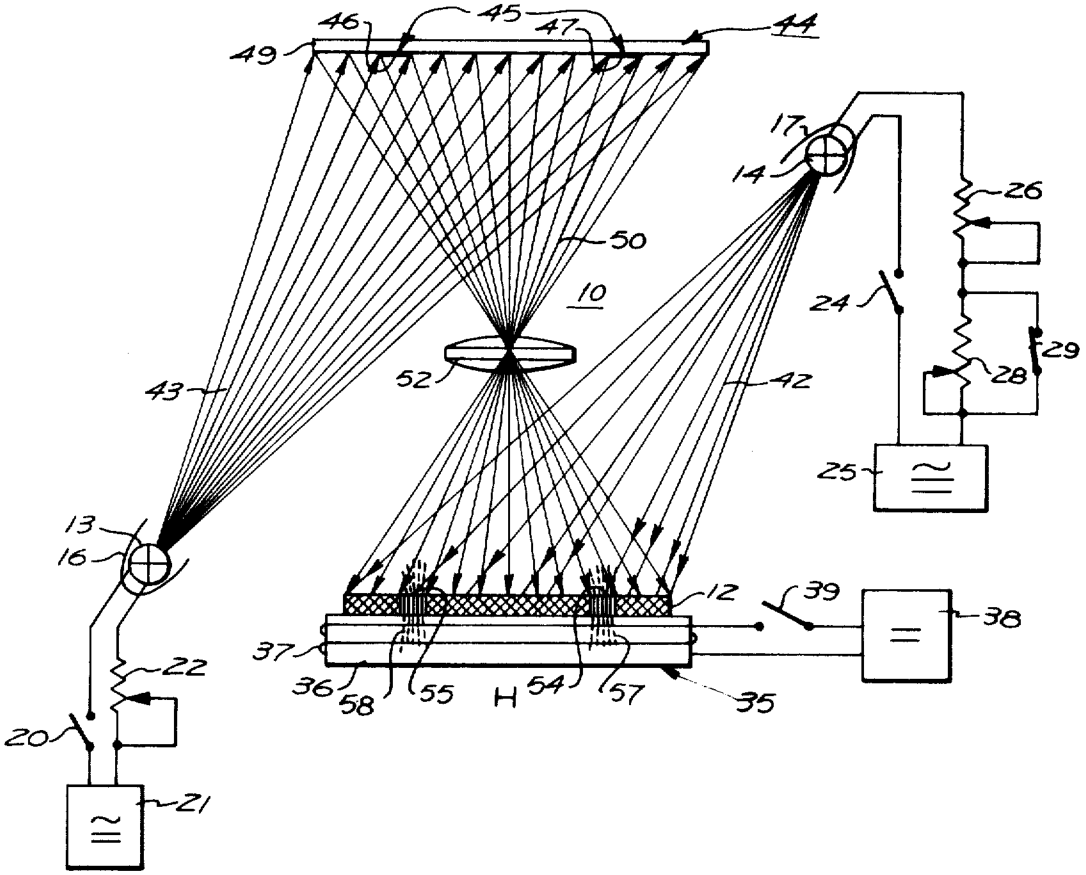
FIG. 1 is a side view of essential parts of a document-copying apparatus in accordance with a first preferred embodiment of the invention.

The document-copying apparatus 10 shown in FIG. 1 employs a thermomagnetic recording medium 12 which is susceptible to magnetization upon subjection to a cooling cycle in the presence of a magnetic field. Suitable recording media include the thermomagnetic recording media described, for instance, in British Pat. 1,139,232, Improvement Relating to Thermomagnetic Recording, filed by E. I. du Pont de Nemours and Company, and published on Jan. 8, 1969, and the thermomagnetic recording media described in U.S. Pat. No. 3,541,577, by James U. Lemke, issued Nov. 17, 1970 and assigned to the assignee of the subject application. Typically, these media include a supporting base which is preferably made of a high-temperature plastic material, and a coating which contains particles of a low Curie point medium, such as chromium dioxide, and which is deposited on the supporting base.

As has been disclosed in the latter Lemke patent, the magnetic particles in the coating preferably have a shape anisotrophy which dominates crystal anisotropy so as to impart on the recording medium an acute coercivity and remanence curve in the vicinity of the Curie point.

If desired, the light sensitivity of the thermomagnetic medium may be considerably increased by a combination of the thermomagnetic medium with a photoconductor which converts an incoming luminous image into a thermal image that will bring about the desired thermomagnetic effect. Photosensitive thermomagnetic recording media of this type are disclosed in the copending U.S. Pat. application Ser. No. 756,942, Magnetic Imaging, filed Sept. 3, 1968, by Joseph Gaynor and James U. Lemke, and assigned to the assignee of the subject application.

For the purpose of simplicity, the subject application merely shows a one-stratum thermomagnetic recording medium 12, with the understanding, however, that this one-stratum representation is intended to cover thermomagnetic recording media in general, and thermomagnetic recording media of the type disclosed in the aforesaid British patent, the above-mentioned Lemke patent, and the above-mentioned Gaynor and Lamke patent application in particular.

The document-copying apparatus includes two lamps 13 and 14 with accompanying reflectors 16 and 17. If the medium 12 is a photosensitive thermomagnetic medium, the lamps 13 and 14 are designed to emit actinic light to which the medium 12 is sensitive. If the medium 12 does not include photoconductive material, then the lamps 13 and 14 are designed to emit radiations which are capable of heating the magnetic particles in the medium 12 upon impingement thereon.

Upon closure of a normally open switch 20, the lamp 13 is energized from a source 21 of electric current through a variable resistor 22. Similarly, the lamp 14, upon closure of a switch 24, is energized from a source of current 25 through a variable resistor 26.

The resistor 26 is in series with a further variable resistor 28 that is, however, bypassed by a normally closed contact 29.

Figure 2:
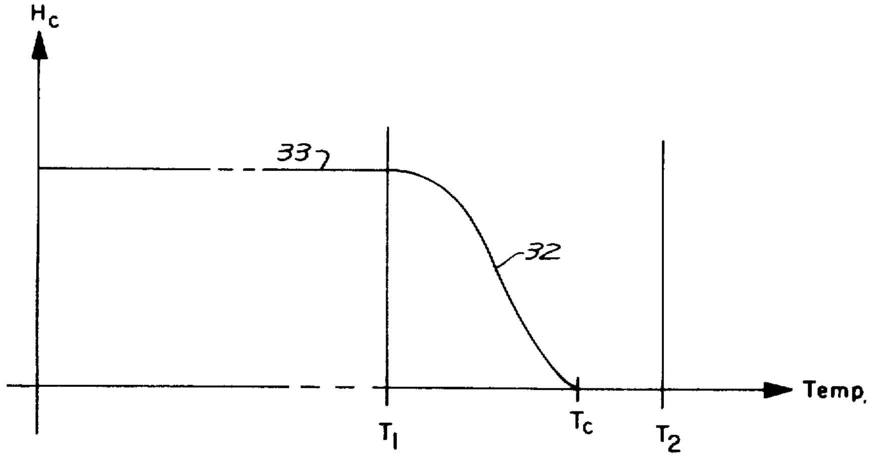
FIG. 2 is a graph plotting the coercivity $H_c$ of a thermomagnetic recording medium against its temperature.

A short restatement of thermoremanent magnetization technique may be helpful at this juncture. Briefly, particles in the recording medium 12 are thermoremanently magnetized if they are first heated to a temperature above their Curie point, and are thereupon cooled to a temperature below their Curie point in the presence of a magnetic field. As indicated in FIG. 2, the particles in the medium 12 to be magnetized are first heated to a temperature $T_2$ which is above their Curie temperature $T_c$, and are thereupon cooled through the Curie point region to a temperature $T_1$ which is preferably below the acute portion 32 of the coercivity curve 33 of the particles. One feature of thermoremanent magnetization is that the magnetization produced by this technique is typically more intensive than the magnetic field to which the medium was exposed during the cooling cycle.

In FIG. 1, the required magnetic field H is provided by an electrically energized magnet structure 35 which includes a plate 36 of magnetizable material and a winding 37 that is energized from a source of electric current 38 (typically direct current) upon closure of a normally open switch 39. Other suitable sources of the required externally produced magnetic field are described in the above-mentioned British patent, the above-mentioned Lemke patent, the above-mentioned Gaynor and Lemke patent application, and also in U.S. Pat. No. 2,793,135, Method and Apparatus for Preparing a Latent Magnetic Image, by J. C. Sims et al., issued May 21, 1957.

According to the embodiment of the invention illustrated in FIG. 1, the variable resistor 26 is adjusted so that the radiations 42 emitted by the lamp 14 heat the recording medium 12 to a temperature $T_2$ above its Curie point $T_c$ and continue to supply the required energy to maintain the medium 12 heated at temperature $T_2$ as long as the switches 24 and 29 remain closed.

The switch 20 is thereupon closed so that the lamp 13 emits radiations 43 which are reflected from the document 44, the information content 45 of which is to be magnetically recorded or copied in the medium 12. According to FIG. 1 the information content 45 is represented by dark characters 46 and 47 which absorb the kind of radiation that is emitted by the lamp 13. The characters 46 and 47 are printed on a sheet 49 that reflects the radiations 43. The radiations 50 which are reflected from the unprinted portions of the document 44 in response to an irradiation by the radiations 43 are, in the embodiment illustrated in FIG. 1, projected by a lens 52 upon the medium 12.

To effect the information-controlled cooling cycle according to the subject invention, two features are embodied in FIG. 1. First, the normally closed switch 29 in the energizing circuit of the lamp 14 is opened while the normally open switch 20 in the energizing circuit of the lamp 13 is closed. This opening of the switch 29 places the resistance of the variable resistor 28 into the energizing circuit of the lamp 14. This, of course, diminishes the energization of the lamp 14 and therefore the intensity of the radiations 42.

Secondly, the resistor 28 is so dimensioned and adjusted that the radiations 42 and 50 maintain the medium 12 heated at temperature $T_2$ at the regions of the medium 12 which are exposed to the reflected radiations 50. In other words, the radiations 50, where they impinge on the medium 12, make up for the decrease in intensity of the radiations 42 by maintaining the temperature of the medium 12 at the particular region at values above the Curie temperature $T_c$ despite the insertion of the resistance represented by the variable resistor 28.

The reason for this arrangement will now become apparent if it is recognized that no significant radiations are reflected by the dark characters 46 and 47. This means that the corresponding regions 54 and 55 of the medium 12 are not exposed to reflected radiations 50. This, in turn, means that there are no incoming radiations 50 at these regions 55 and 54 which would make up for the decrease in incoming heat energy resulting from the opening of the switch 29 and introduction of the variable resistor 28 in the energizing circuit of the lamp 14.

In consequence, the regions 55 and 54 are not maintained at the temperature $T_2$, but will cool to a temperature $T_1$ that is below the Curie point $T_c$. One important factor that will dictate the course and the rate of this cooling cycle is the radiation-absorptive quality of the information content 45, which fact is important in the reproduction of gray scales. To obtain the desired thermoremanent magnetization the switch 39 is closed prior to the initiation of the cooling cycle from $T_2$ to $T_1$ so that the regions 54 and 55 are magnetized as indicated by dotted field lines 57 and 58 during such cooling cycle.

The magnet structure 35 is then deenergized or removed and the lamps 13 and 14 are switched off so that the remainder of the medium 12 cools through the Curie point region. No external field which would cause further magnetization of the medium 12 is applied to such medium during the latter cooling cycle. In other words, care is taken that the regions of the medium 12 which correspond to the reflecting areas of the document 44 are not magnetized.

It will now be recognized that FIG. 1 embodies a thermoremanent magnetization method in which the flow of heat relative to the magnetic recording medium is controlled in response to the information to be recorded and in the course of the cooling cycle during which thermoremanent magnetization takes place. More specifically, the apparatus of FIG. 1 embodies a method in which heat energy (radiations 42) is supplied to the recording medium prior to the cooling cycle, and in which the heat energy supplied to the recording medium is selectively decreased in response to the information 45 to initiate in effect a cooling cycle at the regions of the recording medium at which a magnetic record of the information is to be established.

These inventive measure lead to several advantages which are best appreciated in comparison to relevant prior art techniques.

For instance, if prior art thermoremanent magnetization methodology were followed, the lamp 14 would be deleted and the medium 12 would first be heated to temperature $T_2$ by the reflected radiations 50. The medium 12 would thereupon be cooled through the Curie point $T_c$ in the presence of the magnetic field H. This of course would magnetize all regions of the medium 12 other than the regions 54 and 55 which correspond to the characters 46 and 47. In this manner, the prior art established a magnetic recording which represented a negative of the information content of the document to be copied. Upon printout of the resulting magnetic record a negative image of the original document was obtained.

By contrast, the subject invention provides a positive image of the original document even though it employs thermoremanent magnetization techniques.

Figure 3:
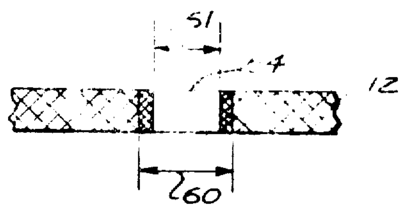
FIG. 3 illustrates thermal conditions at a magnetic recording medium exposed in accordance with prior art practice.
Figure 4:
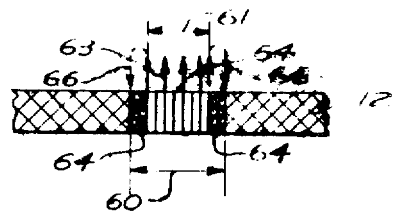
FIG. 4 illustrates thermal conditions at a magnetic recording medium exposed in accordance with an embodiment of the subject invention.

Another advantage of the embodiment illustrated in FIG. 1 is apparent from FIGS. 3 and 4 which, respectively, illustrate thermal conditions at the site of the region 54 of the recording medium 12.

More specifically, FIG. 3 illustrates the decrease in size of the region 54 from an original size 60, which corresponds to the projected size of the character 46 (see FIG. 1), to a subsequent reduced size 61 which results from the flow of heat from portions of the medium adjacent the region 54 into such cooler region 54. Due to this inevitable flow of heat, the recorded size 61 of the character 46 will be smaller than its originally projected size 60, inasmuch as fringes of the region 54 will experience heating to above, and subsequent cooling through, the medium's Curie point along with a similar heating and cooling of the portions of the medium surrounding the portion 54. This further decreases the quality of the copy produced by prior art thermoremanent magnetization techniques.

According to FIG. 4, there may be a similar reduction in the size of the cooler region 54 from the projected size 60 of the character 46 to the approximate size 61 of the region 54 which is present as the same cools through the Currie point $T_c$. Accordingly, a magnetic record 63 is first produced which represents only the reduced size 61. However, after the external magnetic field H (see FIG. 1) has been switched off or removed, the heated fringes 64 of the region 54 will cool through the Curie point $T_c$ along with the background areas of the medium 12. In this manner the fringes 64 will cool in the presence of the magnetic record 63 and are thus susceptible to being magnetized by thermoremanent magnetization.

If the direction of magnetization of the magnetic record 63 extends normally to the surface of the medium 12, then the magnetization 66 of the fringes 64 will have a direction of magnetization or polarity opposite to the direction of magnetization or polarity of the record 63. This provides a sharp gradient at the outline of the magnetic record 63 which materially increases the attainable contrast of the magnetic record and of printed-out images thereof.

A similar edge enhancement has been observed with magnetizations in parallel to the surface of the medium 12.

FIG. 4 thus illustrates two substantial features of the invention:

1. Automatic reconstruction of character size temporarily lost through inevitable heat flow, and 2. Automatic outlining of character images by sharp magnetic gradients.

It will be recognized that both of these features are results of the information-controlled cooling concept according to the subject invention.

Figure 5:
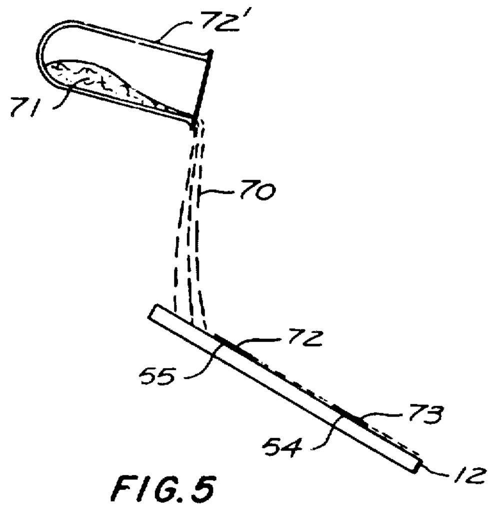
FIGS. 5 and 6 illustrate the printing out of magnetically recorded information.

The magnetic information record produced in the medium 12 may be read out or rendered visible in any desired manner. By way of example, this record may be printed out on one or more sheets of paper. A first step in such printout procedure is illustrated in FIG. 5 in which a magnetic printout toner 70 is sprinkled from a supply 71 in a vessel 72 over the surface of the medium 12. The printout toner may be of a conventional type in which magnetic particles are encapsulated in fusible shells which may be of a thermoplastic material. As the surface of the medium 12 is exposed to the toner 70, toner particles will be attracted and adhere to the magnetized medium regions 54 and 55 and will form dark characters 72 and 73 thereon which correspond to the characters 46 and 47 of the original document 44.

Figure 6:
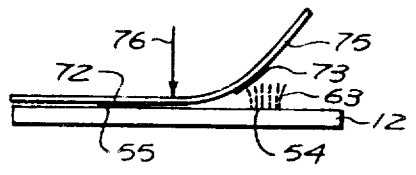

After excessive toner particles have been shaken off the medium 12 the characters 72 and 73 are printed out as schematically indicated in FIG. 6. According to this figure a sheet 75 of paper is forcefully brought into contact with the medium 12 as indicated by the arrow 76. Heat may be employed if desired to cause a fusing of the characters 72 and 73 to the sheet 75 so that the characters stick to the sheet as indicated at 73 when the same is removed from the medium 12. Despite such printout, the magnetic record will of course remain on the medium 12 as indicated at 63 until an intended erasure thereof by an alternating magnetic field or by a uniform above-Curie-point heating has taken place. Accordingly, a practically unlimited number of copies can be produced upon the provision of a magnetic master record.

Figure 7:
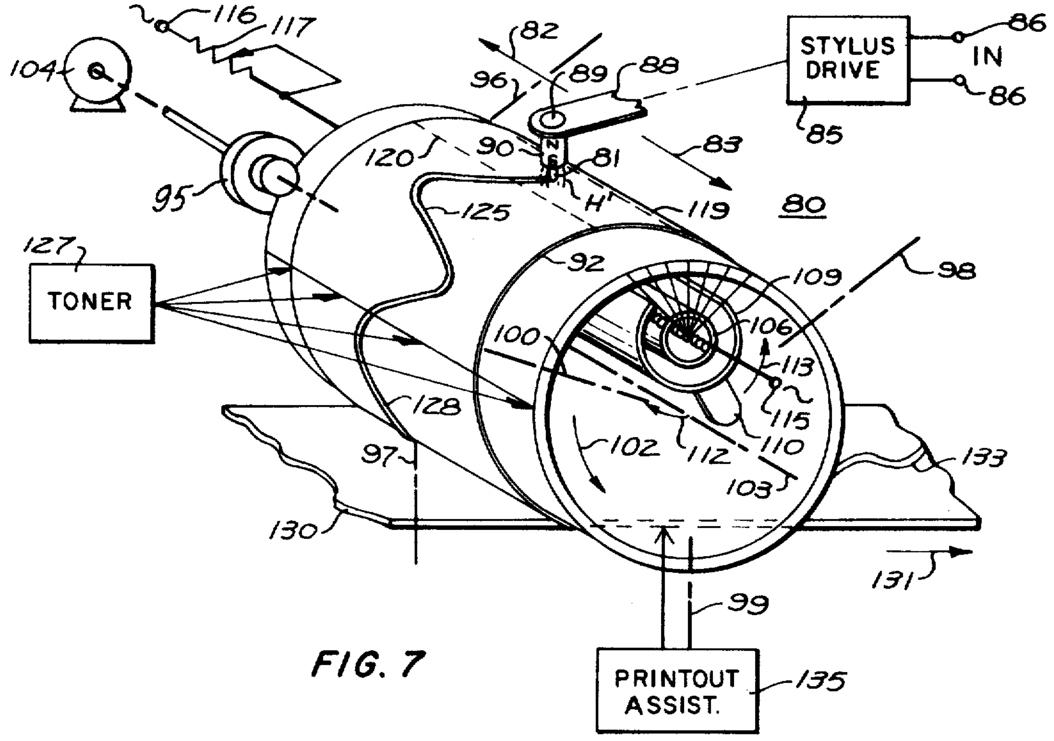
FIG. 7 is a perspective view of an oscillograph apparatus in accordance with a further embodiment of the subject invention.

A further embodiment which represents an outgrowth of the basic information-controlled cooling concept of the subject invention is shown in FIG. 7. Briefly, FIG. 7 illustrates essential parts of a recording oscillograph 80 in which a stylus 81 is oscillated in the directions 82 and 83 by a stylus drive 85 that responds to a variable input signal that is received in input terminals 86. Suitable stylus drives are conventional in the art of oscillography and typically include a galvanometer movement.

Figure 8:
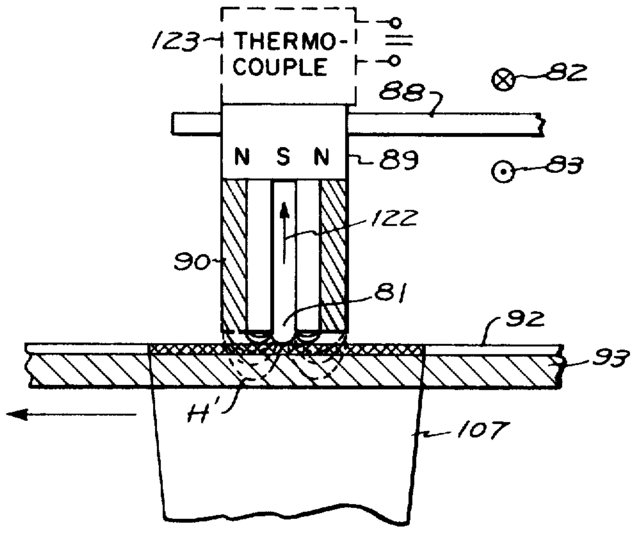
FIG. 8 illustrates a detail of the apparatus of FIG. 7.

As shown in FIG. 7, and also on an enlarged scale in FIG. 8, the stylus 81 is mounted on a movable mounting blade 88. The stylus 81 is made of a ferromagnetic material and is in contact with a radially magnetized permanent magnet 89 which, in turn, is in contact with a cylindrical pole piece 90 that completes a magnetic structure for the provision of a magnetic field H' that functionally corresponds to the magnetic field H shown in FIG. 1.

The stylus 81 is in contact with a thermal magnetic recording medium 92 that corresponds functionally to the medium 12 shown in FIG. 1 and that may be composed of the same materials as that medium. The medium 92 is disposed in the form of an endless layer on a hollow-cylindrical drum 93 of an infrared-transparent material.

The drum 93 is mounted by six roller structures, one of which is shown at 95 while the other five are symbolized by phantom lines 96–100. The drum 93 is rotated about an axis 103 in the direction of the arrow 102 by a drive 104 which acts through the roller structure 95. A source 106 of heat radiations 107 is disposed inside the drum 93 in parallel to the axis 103. The source 106 may include a conventional tungsten lamp which emits a strong component in the infrared spectrum. A reflector 109 is associated with the lamp and is movable by means of a handle 110 in the directions indicated by arrows 112 and 113 so that the location of the heat exposure of the medium 92 relative to the location of contact of the stylus 81 may be controlled.

The lamp 106 is energized from a source of electric current (not shown) through terminals 115 and 116 and a variable resistor 117 which permits adjustment of the intensity of the thermal radiations 107. The purpose of the source 106 is to heat the medium 92 substantially between the dotted lines 119 and 120 to the temperature $T_2$ indicated in FIG. 2 and located above the Curie point $T_c$ of the recording medium 92.

The function of the stylus 81 is to cool the medium 92 to the temperature $T_1$ wherever it contacts the medium 92. An arrow 122 in FIG. 8 indicates such cooling or removal of heat. A thermocouple or other cooling means, indicated by dotted lines 123 may be employed in heat transfer relationship with the stylus 81 if the dissipation of heat by the blade 88 is not sufficient to effect the desired cooling cycle.

Since such cooling takes place in the presence of the magnetic field H' thermoremanent magnetization will take place and produce a magnetic trace 125 which represents the oscillations of the stylus 81 and blade 88 and which thus represents the input signal received at terminals 86. The handle 110 is used to adjust the reflector 109 so that the boundary 120 of thermal exposure is sufficiently close to the stylus 81 to prevent a premature erasure of the magnetic track 125 through reheating of the medium to a temperature $T_2$, or even to the Curie point $T_c$.

A toning structure 127 provides toner particles which are attracted by and adhere to the magnetic track 125. Suitable magnetic toning structures are known in the art of magnetic printing (see, for instance, U.S. Pat. No. 2,932,278, by J. C. Sims, issued Apr. 12, 1960). The resulting toned track 128 is continuously printed out on a web or sheet of paper 130 which is driven in the direction of the arrow 131. The resulting oscillograph trace, which is not only visible but magnetically readable, is shown at 133. As desired or necessary, printout assisting means 135, which may include structure for applying pressure between the sheet 130 and the medium 92, and which may include heating means for fusing the toner particles to each other and to the sheet 130, may be employed.

It will now be recognized that FIGS. 7 and 8 show an embodiment which illustrates a further extension of the basic inventive concept of effecting magnetization by an information-controlled cooling cycle. It will also be recognized that the information is employed according to FIGS. 7 and 8 to control or determine the successive locations on the medium 92 at which the cooling cycle required for thermoremanent magnetization is effected. In brief, the information-controlled cooling in the embodiment of FIGS. 7 and 8 involves a spatial control of the cooling locations.

After a printout thereof, the magnetic track 128 is continuously erased as it enters the heating zone of the medium 92 at the boundary 119. In this manner a highly effective and efficient continuous printout of variable information is effected.

Figures 9, 10:
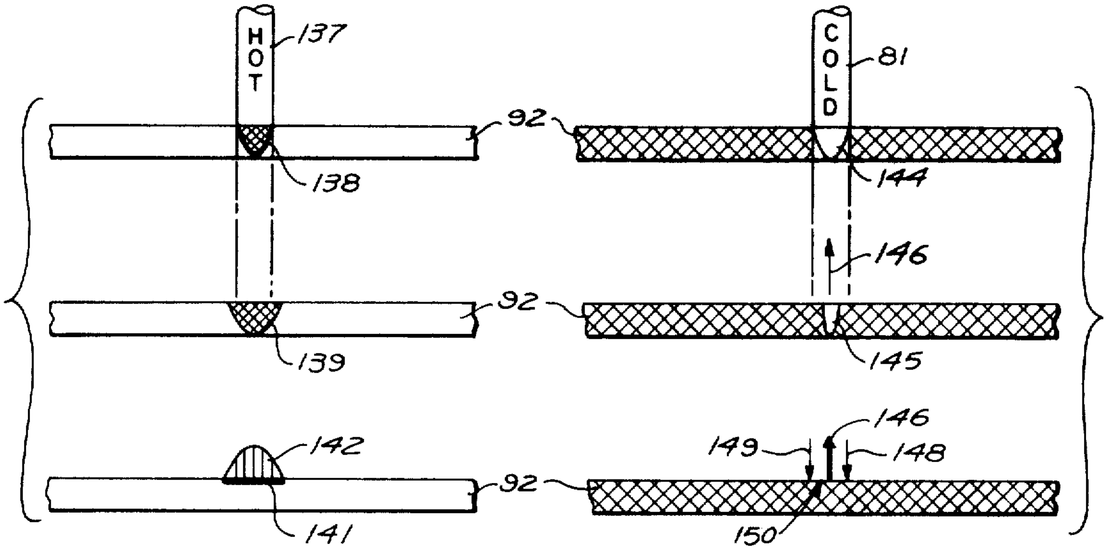
FIG. 9 PRIOR ART, FIG. 10
FIG. 9 illustrates thermal conditions at a magnetic recording medium exposed in accordance with prior art practice.
FIG. 10 illustrates thermal conditions at a magnetic recording medium cooled in accordance with an embodiment of the subject invention.

A further advantage of the invention is apparent from a comparison of FIGS. 9 and 10. FIG. 9 illustrates a prior art approach according to which a heated stylus 137 is placed into contact with the medium 92 in order to heat it to a temperature $T_2$ preparatory to a thermoremanent magnetization cooling cycle. The area heated by the stylus 137 is approximately shown at 138. Since heat is dissipated into the remainder of the medium 92, such heated area broadens as shown at 139.

Moreover, since such heat dissipation does not result in a heating of all the areas affected thereby to above the Curie point $T_c$, the magnetization of the resulting trace will be uneven and will taper off at the lateral fringes thereof. A cross section through the resulting magnetic gradient pattern of the oscillograph trace 141 is shown at 142. Since magnetic toner is more readily attracted by sharp magnetic gradients, the gradient pattern 142 with gradually declining lateral regions is generally undesirable.

FIG. 10 illustrates the case shown in FIGS. 7 and 8 in which the magnetic medium is uniformly heated within a selected zone, and in which thermoremanent magnetization is effected in the presence of a magnetic field by means of the cooled stylus 81. The area 144 in FIG. 10 indicates the region cooled by the contacting stylus 81. As the medium 92 travels away from the stylus, heat is dissipated from the remainder of the medium 92 into the region 144 so that such cooled region is laterally narrowed as shown at 145. This also narrows the lateral extent of the resulting magnetic record 146. As the remainder of the medium 92 cools upon its departure from the heated zone (see boundary 120 in FIG. 7) the magnetization 146 produces further magnetic gradients 148 and 149 which are of a polarity opposite to the magnetization 146 so that the resulting magnetic record 150 is characterized by sharp magnetic gradients which promote the desired attraction of magnetic toner.

FIGS. 11 through 14 illustrate further embodiments of the information-controlled cooling concept according to the subject invention. To avoid repetitive description portions, like parts as among FIGS. 7 through 14 are indicated by like reference numerals. In addition, the permanent magnet structure 89 and 90 shown in FIGS. 7 and 8 has been replaced in FIGS. 11 through 15 by an electrically energized magnet structure 152 which also has the purpose of providing the requisite magnetic field during the cooling cycle for the desired thermoremanent magnetization effect.

Figures 11, 13:
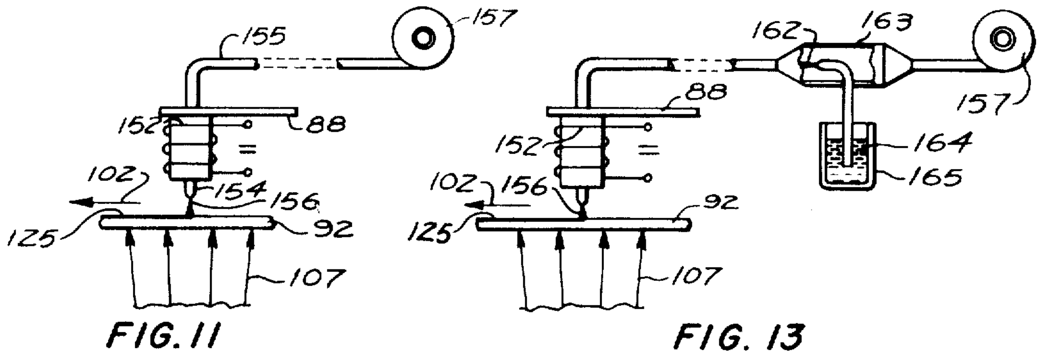
FIGS. 11 through 17 illustrate various modifications of the embodiment of FIG. 7.

According to FIG. 11, the above-mentioned stylus 81 is replaced by a nozzle 154 which is supplied with a coolant through a tube 155. The coolant may for instance be a liquid or a gas which issues from the nozzle as shown at 156 to cool the medium 92 to provide the above-mentioned magnetized track 125. By way of example, FIG. 11 shows a blower 157 which pumps cooling air that is supplied into the tube 155 to the nozzle 154 for the provision of a cooled and magnetized trace on the recording medium 92.

Figure 12:
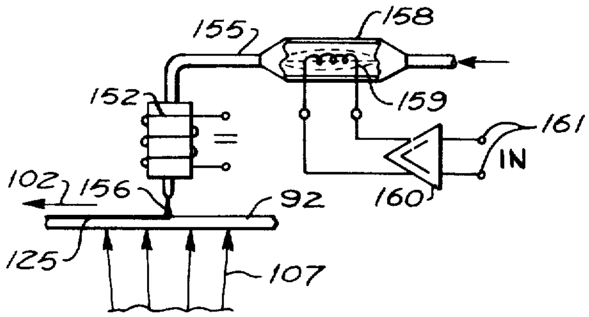

According to FIG. 12, the cooling medium is passed through a chamber 158 containing a heating coil 159. The heating coil 159 is energized by an amplifier 160 in response to an input signal applied to input terminals 161. No cooling takes place if the coolant is heated to a temperature above $T_c$. On the other hand, a cooled and magnetized trace 125 is provided on the medium 92, if the amplifier 160 does not energize the heating element 159. In this manner, it is possible to magnetically record information by a cooling of the coil 159 between heating intervals. The resulting magnetic record is typically of a binary nature.

According to FIG. 13, a liquid coolant 162 is entrained in a venturi chamber 163 in a gaseous stream, such as an airstream, generated by the blower 157. The liquid coolant 162 is drawn from a supply 164 contained in a vessel 165. The coolant 162 is evaporated as the coolant jet 156 contacts the heated medium 92. To assure such evaporation, the liquid coolant 162 preferably has a boiling point lower than the Curie temperature $T_c$ of the medium 92.

Figure 14:
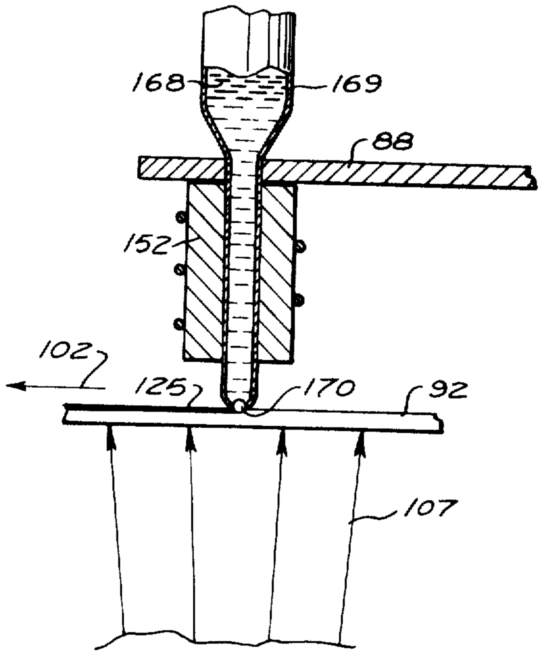

According to FIG. 14, a liquid coolant 168 is provided in a pen structure 169 which, in the manner of a ballpoint pen has a ball 170 at the point thereof. The liquid from the supply 168 again evaporates as it contacts the medium 92 and thermoremanent magnetization takes place during the ensuing cooling cycle.

Figure 15:
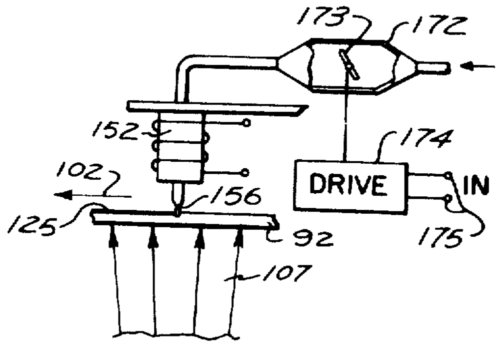

The embodiment of FIG. 15 contains a chamber 172 in which a butterfly valve 173 regulates the flow of the coolant issuing at 156. The valve 173 is actuated by a drive 174 which is responsive to a varying signal received at the input terminal 175. A magnetic record is established at 125 as the butterfly valve 173 moves to permit increased portions of the coolant to impinge on the medium 92.

It will now be recognized that FIGS. 11 through 15 illustrate several embodiments according to the invention which uses various cooling means, including liquid and gaseous coolants, and liquid coolants entrained in gaseous coolants. Also, FIGS. 1 through 15 show embodiments in which the location of impringement of the coolants is varied in response to the information, and embodiments in which the volume or the temperature of the coolant is controlled in response to the information to be magnetically recorded. Also shown are embodiments which utilize the heat of evaporation of liquids for cooling purposes.

Figure 16:
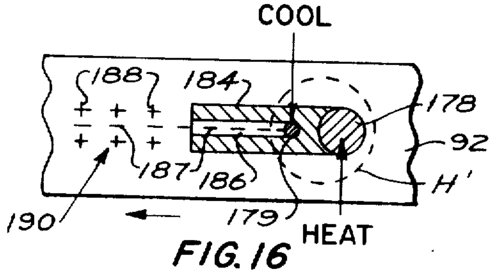
Figure 17:
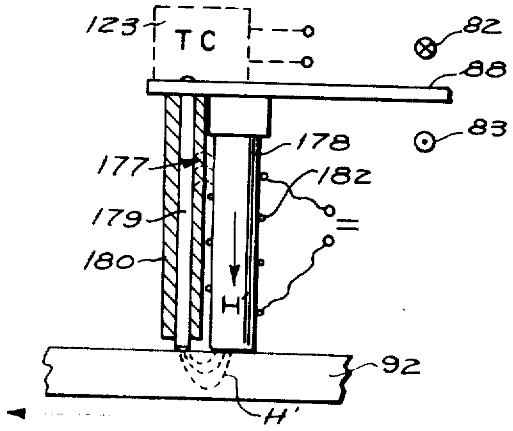

A further embodiment of the invention is shown in FIGS. 16 and 17. More specifically, these figures show a stylus structure 177 that is composed of a heated stylus 178 and a cooled stylus 179 that is insulated by a heat-insulating sleeve 180 with respect to the heated stylus 178. As before, a thermocouple or other cooling means 123 may be provided for supporting the cooling function of the stylus 179.

The heated stylus 178 carries an electrically energized heating coil 182 which also serves as a magnet coil for providing the requisite magnetic field H′ at the recording medium 92.

The heated stylus 178 is dimensioned to heat the recording medium 92 to a temperature $T_2$ above its Curie point $T_c$ along a first track 184. The cooling stylus 179 is dimensioned to cool the track 184 along a second track 186 which is narrower than the first track 184.

As the track 186 is cooled in the presence of the magnetic field H′, it will be magnetized as indicated by the minus signs 187, which stand for one direction of magnetization. As the remainder of the track 184 subsequently cools through the Curie point, the magnetization presented by the minus signs 187 produces, by thermoremanent magnetization, an oppositely directed magnetization presented by plus signs 188. The result is a magnetic track 190 which is characterized by sharp magnetic gradients that readily attract printout toner particles.

In accordance with the preferred embodiment shown in FIGS. 16 and 17, the styli 178 and 179 are attached to the oscillograph blade or arm 88 to be jointly moved in he direction of arrows 82 and 83 in response to a variable input signal.

The inventive concept of information-controlled cooling is also useful in producing a magnetic spot the location of which is varied in response to input information, and which may be rendered visible or printed out to produce traces or other graphical representations of the information.

Since this embodiment is germane not only to this invention but also to another line of development, it is disclosed and claimed in my above-mentioned copending U.S. Pat. application Ser. No. 821,394.

It will now be recognized that the subject invention produces a wealth of novel methods and apparatus, of which only a limited number of representative embodiments could be disclosed herein.

By way of representative summary, and not by way of limitation, it will be noted that the subject invention leads to method and apparatus in which the flow of heat during the information-controlled cooling cycle is regulated by controlling the rate of such flow of heat relative to the recording medium in response to the information to be recorded. Alternatively, it is the locations at which heat flows relative to the recording medium that are controlled in response to the information. In another embodiment, the heat flow under discussion is controlled by selectively removing heat energy from the recording medium in response to the information. In yet another embodiment, such flow of heat is controlled by supplying heat energy to the recording medium prior to the cooling cycle, and by selectively decreasing such energy supply to the recording medium in response to the information. In still another embodiment, the flow of heat is controlled by applying cooling means to regions of the recording medium which are selected in response to the information, or by evaporating a coolant at such regions.

Further variations or modifications within the spirit and scope of the invention are apparent from the illustrated embodiments or suggest themselves to those skilled in the art from a study of the subject disclosure.

I claim:

1. In a method of recording information in a magnetic recording medium magnetizable by subjection to a cooling cycle through a temperature range in the presence of a magnetic field, the improvement comprising the steps of providing said magnetic recording medium with a temperature above said range, providing cooling means, selecting portions of said recording medium in response to said information, applying said magnetic field to said recording medium, applying said cooling means only to said selected portions of said recording medium so as to subject only said selected portions to said cooling cycle in the presence of said magnetic field whereby to provide a magnetic record of said information.

2. A method as claimed in claim 1, wherein said cooling means are provided by providing an evaporable coolant, and said coolant is applied to and evaporated only on said selected portions so as to subject only said selected portions to said cooling cycle.

3. In a method of recording information in a magnetic recording medium magnetizable by subjection to a cooling cycle through a temperature range in the presence of a magnetic field, the improvement comprising the step of applying heat energy to said recording medium to prepare said recording medium for said cooling cycle, providing a thermal pattern corresponding to said information, providing an external magnetic field, applying said external magnetic field to said recording medium, applying said thermal pattern to said recording medium and reducing said heat energy to initiate a cooling cycle of information-representative portions of said recording medium, and continuing the application of said thermal pattern and of said external magnetic field to said recording medium after said initiation of said cooling cycle whereby to provide a magnetic record of said information.

4. A method as claimed in claim 3, wherein said information is recorded on a record having light-reflecting regions and light-absorbing regions, and wherein said thermal pattern of said information is provided by reflecting light from said record onto said recording medium.

5. In a method of recording information in a magnetic recording medium magnetizable by subjection to a cooling cycle through a temperature range in the presence of a magnetic field, the improvement comprising the steps of providing said magnetic recording medium with a temperature above said range, providing cooling means capable of effecting said cooling cycle, applying said cooling means to said recording medium, and varying the application of said cooling means to said recording medium in response to said information and applying a magnetic field to said recording medium to provide a magnetic record of said information on said recording medium.

6. A method as claimed in claim 5, wherein said recording medium is substantially uniformly heated to said temperature above said range preparatory to application of said cooling means.

7. A method as claimed in claim 5, wherein:

the application of said cooling means to said recording medium is varied by selectively heating said cooling means in response to said information.

8. A method as claimed in claim 5, wherein:

said cooling means includes a coolant, and the application of said cooling means to said recording medium is varied by controlling in response to said information the flow of said coolant to said recording medium.

9. A method as claimed in claim 5, wherein:

the application of said cooling means to said recording medium is varied by varying in response to said information the location of application of said cooling means on said recording medium.

10. A method as claimed in claim 9, wherein said magnetic field is applied to said region of said recording medium, and the location of application of said magnetic field to said recording medium is varied in accordance with variations of the location of application of said cooling means to said recording medium.

11. In a method of recording information in a magnetic recording medium magnetizable by subjection to a cooling cycle in the presence of a magnetic field, the improvement comprising the steps of applying heat to said recording medium along a track, altering the course of said track in response to said information, and cooling said recording medium along said track and applying said magnetic field to said recording medium along said track to provide a magnetic record of said information.

12. A method as claimed in claim 11, wherein said recording medium is selectively cooled inside said track to provide for magnetization of said recording medium inside said track in a first sense of magnetization and to leave parts of said track in a heated condition, and wherein said heated parts are cooled to provide magnetization of said parts in a second sense of magnetization.

13. A method as claimed in claim 11, wherein said recording medium is cooled along a band following said track, but being of lesser width than said track, to provide for magnetization of said recording medium along said band in a first sense of magnetization, and wherein the remainder of said track is cooled to provide magnetization of said recording medium adjacent said band in a second sense of magnetization.

14. In apparatus for recording information on a magnetic recording medium magnetizable by subjection to a cooling cycle in the presence of a magnetic field, the improvement comprising in combination:

first means operatively associated with said recording medium for heating said recording medium preparatory to said cooling cycle;

second means for cooling said recording medium through said cooling cycle;

third means operatively associated with said second means and said recording means for applying said second means only to portions of said recording medium selected in response to said information whereby only said selected portions are cooled by said second means through said cooling cycle; and fourth means operatively associated with said recording medium for providing and applying to said recording medium an external magnetic field during cooling of said selected portions of said recording medium through said cooling cycle, whereby to provide a magnetic record of said information.

15. Apparatus as claimed in claim 14, wherein said second means include means for providing coolant, and means for applying said coolant only to said selected portions of said recording medium.

16. In apparatus for recording information on a magnetic recording medium magnetizable by subjection to a cooling cycle in the presence of a magnetic field, the improvement comprising in combination:

first means operatively associated with said recording medium for supplying heat energy to said recording medium to prepare said recording medium for said cooling cycle;

second means operatively associated with said recording medium for applying said magnetic field to said recording medium during said cooling cycle;

third means operatively associated with said first means for reducing said heat energy supply to said recording medium to initiate said cooling cycle; and fourth means operatively associated with said recording medium for providing and applying to said recording medium after initiation of said cooling cycle a thermal pattern of said information providing a magnetic record of said information.

17. Apparatus as claimed in claim 16, wherein said information is recorded on a record having light-reflecting regions and light-absorbing regions, and wherein said fourth means provide and apply said thermal pattern by reflecting light from said record onto said recording medium.

18. In apparatus for recording information on a magnetic recording medium magnetizable by subjection to a cooling cycle in the presence of a magnetic field the improvement comprising in combination:

first means operatively associated with said recording medium for heating said magnetic recording medium preparatory to said cooling cycle;

second means operatively associated with said recording medium for applying said magnetic field to said recording medium;

third means applied to said recording medium for selectively cooling a portion of said recording medium through said cooling cycle; and fourth means connected to said third means and adapted to receive said information for varying the application of said third means to said recording medium in response to said information to provide a magnetic record of said information on said recording medium.

19. Apparatus as claimed in claim 18, wherein said first means are constructed to heat said magnetic recording medium substantially uniformly preparatory to said cooling cycle.

20. Apparatus as claimed in claim 18 wherein:

said fourth means include means for selectively heating said third means in response to said information.

21. Apparatus as claimed in claim 18, wherein:

said third means include means for applying a coolant to said medium; and said fourth means include means for controlling in response to said information the flow of said coolant to said recording medium.

22. Apparatus as claimed in claim 18, wherein:

said fourth means include means for varying the location of application of said third means relative to said recording medium in response to said information.

23. Apparatus as claimed in claim 22, wherein said fourth means are connected to said second means for varying the location of said second means relative to said recording medium in accordance with variations of the location of said third means.

24. In apparatus for recording information on a magnetic recording medium magnetizable by subjection to a cooling cycle in the presence of a magnetic field, the improvement comprising in combination:

first means operatively associated with said recording medium for applying heat to said recording medium along a track;

second means connected to said first means for altering the course of said track in response to said information;

third means operatively associated with said recording medium for cooling said recording medium along said track; and fourth means operatively associated with said recording medium for applying a magnetic field to said recording medium along said track and during said cooling by said third means to provide a magnetic record of said information.

25. Apparatus as claimed in claim 24, wherein said third means are constructed to selectively cool said recording medium inside said track to provide for magnetization of said recording medium inside said track in a first sense of magnetization and to leave parts of said track in a heated condition, whereby aid heated parts are magnetized in a second sense of magnetization upon a cooling thereof.

26. Apparatus as claimed in claim 24, wherein said third means are constructed to cool said recording medium along a band following said track, but being of lesser width than said track, to provide for magnetization of said recording medium along said band in a first sense of magnetization, whereby the remainder of said track is magnetized in a second sense of magnetization upon cooling thereof.